US009596359B2

(12) United States Patent
Carlson et al.

(10) Patent No.: US 9,596,359 B2
(45) Date of Patent: Mar. 14, 2017

(54) MOBILE COMMUNICATION DEVICE CONFIGURED FOR TRANSIT APPLICATION

(75) Inventors: Mark Carlson, Half Moon Bay, CA (US); Patrick Stan, Pacifica, CA (US)

(73) Assignee: Visa International Service Association, San Francisco, CA (US)

( * ) Notice: Subject to any disclaimer, the term of this patent is extended or adjusted under 35 U.S.C. 154(b) by 785 days.

(21) Appl. No.: 12/491,143

(22) Filed: Jun. 24, 2009

(65) Prior Publication Data

US 2010/0017275 A1 Jan. 21, 2010

Related U.S. Application Data

(60) Provisional application No. 61/076,099, filed on Jun. 26, 2008.

(51) Int. Cl.
| | |
|---|---|
| *G06Q 20/20* | (2012.01) |
| *G06Q 20/40* | (2012.01) |
| *G06Q 20/32* | (2012.01) |
| *G07B 15/00* | (2011.01) |
| *H04M 15/00* | (2006.01) |
| *G06Q 30/02* | (2012.01) |
| *G06Q 30/06* | (2012.01) |
| *G06Q 50/30* | (2012.01) |

(Continued)

(52) U.S. Cl.
CPC ............ *H04M 15/68* (2013.01); *G06Q 20/32* (2013.01); *G06Q 20/3224* (2013.01); *G06Q 30/0284* (2013.01); *G06Q 30/06* (2013.01); *G06Q 50/30* (2013.01); *H04M 15/00* (2013.01); *H04M 17/00* (2013.01); *H04W 4/24* (2013.01); *H04M 2215/0196* (2013.01)

(58) Field of Classification Search
CPC ...... G06Q 20/40; G06Q 20/20; G06Q 20/341; G06Q 20/32
USPC .......................... 705/44, 13, 41; 235/380, 382
See application file for complete search history.

(56) References Cited

U.S. PATENT DOCUMENTS

| | | | |
|---|---|---|---|
| 5,948,040 A | 9/1999 | Delorme et al. | |
| 6,415,291 B2 * | 7/2002 | Bouve et al. | 701/533 |
| 6,494,369 B1 * | 12/2002 | Kikuchi | 235/384 |

(Continued)

FOREIGN PATENT DOCUMENTS

| | | |
|---|---|---|
| KR | 10-2002-0023556 A | 3/2002 |
| KR | 10-2006-0093622 A | 8/2006 |
| WO | 2008/039796 A2 | 4/2008 |

OTHER PUBLICATIONS

U.S. Appl. No. 61/223,349, filed Jul. 6, 2009.

(Continued)

*Primary Examiner* — Akiba Allen
(74) *Attorney, Agent, or Firm* — Kilpatrick Townsend & Stockton LLP

(57) ABSTRACT

An apparatus configured for transit application and methods for utilizing the apparatus for transit application is disclosed. One embodiment of the invention is directed to a mobile communication device comprising a processor, a computer readable medium coupled to the processor, wherein the computer readable medium comprises code for receiving a first transit location, code for displaying options to select a second transit location, code for receiving a selection for a second transit location, and code for sending an authorization request message to an issuer associated with the mobile communication device.

13 Claims, 11 Drawing Sheets

(51) Int. Cl.
*H04M 17/00* (2006.01)
*H04W 4/24* (2009.01)

(56) References Cited

U.S. PATENT DOCUMENTS

| | | |
|---|---|---|
| 7,376,431 B2 | 5/2008 | Niedermeyer |
| 7,527,208 B2 | 5/2009 | Hammad et al. |
| 7,636,629 B2 * | 12/2009 | Tajima et al. ................. 701/431 |
| 2001/0027422 A1 | 10/2001 | Brandrud |
| 2001/0037174 A1 * | 11/2001 | Dickerson .................... 701/200 |
| 2002/0100803 A1 * | 8/2002 | Sehr ............................. 235/384 |
| 2006/0218064 A1 | 9/2006 | Andrews et al. |
| 2008/0116264 A1 | 5/2008 | Hammad et al. |
| 2008/0128513 A1 | 6/2008 | Hammad et al. |
| 2008/0179394 A1 | 7/2008 | Dixon et al. |
| 2008/0183565 A1 | 7/2008 | Dixon et al. |
| 2008/0183622 A1 | 7/2008 | Dixon et al. |
| 2008/0201212 A1 * | 8/2008 | Hammad et al. .............. 705/13 |
| 2008/0203152 A1 | 8/2008 | Hammad et al. |
| 2008/0203170 A1 | 8/2008 | Hammad et al. |
| 2008/0208681 A1 | 8/2008 | Hammad et al. |
| 2008/0263633 A1 * | 10/2008 | Banga et al. .................... 726/3 |
| 2009/0171682 A1 * | 7/2009 | Dixon et al. ..................... 705/1 |
| 2009/0184163 A1 | 7/2009 | Hammad et al. |

OTHER PUBLICATIONS

U.S. Appl. No. 61/104,537, filed Oct. 10, 2008.
Search/Examination dated Mar. 2, 2010 from International Application No. PCT/US2009/048778, 14 pages.
Patent Examination Report mailed Sep. 17, 2015 in Australian Patent Application No. 2009262066, 3 pages.
Patent Examination Report No. 3 from Australian Patent Application No. 2009262066, 3 pages.

* cited by examiner

MOBILE COMMUNICATION DEVICE CONFIGURED FOR TRANSIT APPLICATION

CROSS-REFERENCES TO RELATED APPLICATIONS

The present application is a non-provisional application of and claims priority to U.S. Provisional Application No. 61/076,099, filed on Jun. 26, 2008, the entire contents of which are herein incorporated by reference for all purposes.

BACKGROUND

Many people make regular use of transit systems to commute to work or to travel for a variety of purposes. Transit systems include public transit systems such as buses, subways, trains, ferries, and the like. Some form of payment is typically required to use these transportation systems. For example, a user may be required to have the exact fare in cash to purchase a ticket or to enter a system. This is inconvenient because a user may not always have cash or exact change on hand. Also, it may take time for each user to insert cash into a fare machine or hand cash to a transit operator, causing lines and delays at each stop.

Some transit systems allow a user to purchase a ticket or pass in advance from a kiosk or cashier. This may eliminate the need for the user to have cash or exact change, however, it still takes time for a user to purchase the ticket or pass in advance and to pass the ticket or pass through a card reader or hand the ticket or pass to the transit operator to gain access to the transit system. In addition, different transit system options, such as a bus or subway system, are often offered by different transit agencies. Thus, a user must purchase one ticket or pass from one transit agency and then another ticket or pass for another transit agency. This is not only inconvenient because the user has to have multiple tickets or passes available, but is also time consuming for a user to stop and buy a ticket at different transfer points to use a different system. For example, if a transit user is headed to the airport, he or she may plan to take a bus to the subway and then the subway to the airport. The user would have to first purchase a ticket for the bus to get to the subway and then stop to purchase a separate ticket to take the subway.

Another means of transit fare payment is to use some form of payment card from which a fare can be deducted against a previously established balance, or to which a fare can be applied as a credit type debt to be paid at a later date. However, as with a ticket or pass described above, such payment cards generally require that the user pass the card through a card reader or other mechanism, or hand the card to a transit operator. Again, this requirement is inefficient and sub-optimal as transit users are often in a hurry, and do not wish to wait in lines or engage in a formal transaction process that may require more time than desired for authentication of the user and approval of the transaction.

The problems encountered in standard payment card systems has led to an interest in the use of contactless "smart" cards or contactless smart chips as part of a fare payment system. A smart card is generally defined as a pocket-sized card (or other portable payment device) that is embedded with either a microprocessor and one or more memory chips, or one or more memory chips with non-programmable logic. The microprocessor type card typically can implement certain data processing functions, such as to add, delete, or otherwise manipulate information stored in a memory location on the card. In contrast, the memory chip type card (for example, a pre-paid phone card) can only act as a file to hold data that is manipulated by the reading device to perform a pre-defined operation, such as debiting a charge from a pre-established balance held in the memory or secure memory. Smart cards, unlike magnetic stripe cards (such as standard credit cards), can implement a variety of functions and contain a variety of types of information on the card. Therefore, in some applications they do not require access to remote databases for the purpose of user authentication or record keeping at the time of a transaction. A smart chip is a semiconductor device that is capable of performing most, if not all, of the functions of a smart card, but may be embedded in another device.

Smart cards come in two general varieties; the contact type and the contactless type. A contact type smart card is one that includes contacts which enable access to the data and functional capabilities of the card, typically via some form of terminal or card reader. A contactless smart card is a smart card that incorporates a means of communicating with the card reader or terminal without the need for direct contact. Thus, such cards may effectively be "swiped" by passing them close to the card reader or terminal. Such contactless cards typically communicate with the card reader or terminal using RF (radio-frequency) technology, wherein proximity to an antenna causes data transfer between the card and the reader or terminal. Contactless cards have found uses in banking and transit applications, as they may not require removal from one's wallet or pocket in order to complete a transaction. Further, because of the growing interest in such cards, standards have been developed that govern the operation and interfaces for contactless smart cards, such as the ISO 14433 standard.

Even though contactless smart cards provide a solution to some of the problems encountered by standard payment cards in a transit fare payment and collection environment, they do not provide a complete solution. As indicated above, the speed of the transaction for the user is an important consideration. This means that the transit fare payment and collection process can not be performed effectively using a standard on-line authentication and approval process, as may be used for a purchase transaction at a retail point of sale through the financial payment network. This presents a difficulty because effective fraud prevention typically requires authentication that the card user is entitled to access the transit system and has sufficient funds for the desired transaction. In addition, different transit systems will typically have different authentication requirements, fare calculations, and ancillary data requirements. This means that the smart card must contain the data relevant for the transit system a user wishes to utilize when the user attempts to access the system. This can become a significant problem if a user wishes to utilize more than one transit system, such as two transit agencies within a single geographical area or transit systems in two different cities or locations. Moreover, this may require a user have multiple cards, one for each type of transit system the user may utilize. The user may also need to have additional cards other than a user's regular payment card.

Further, as transit typically involves moving between stations, with different fare calculations and rates required depending upon the actual travel distance, direction, patron category, and/or times of use, fares may need to be computed based on station entry and exit location, direction, mode of travel, category of patron, and possibly time of day. This would require that the smart card terminals/readers at each station or route be able to perform these computations based on data stored and retrieved from a user's card, and subsequent card terminals/readers be able to access data written to the card at previous stations.

Thus, the transit environment presents several issues that make use of a standard contactless smart card or chip problematic. Embodiments of the invention address the above problems, and other problems, individually and collectively.

BRIEF SUMMARY

Embodiments of the invention are direction to systems, apparatuses and methods that allow for access to a location using a mobile communication device.

One embodiment of the invention is directed to a mobile communication device comprising a processor, a computer readable medium coupled to the processor, wherein the computer readable medium comprises code for receiving a first transit location, code for displaying options to select a second transit location, code for receiving a selection for a second transit location, and code for sending an authorization request message to an issuer associated with the mobile communication device.

Another embodiment of the invention is directed to a method for conducting a transit transaction, the method comprising receiving a first transit location, displaying options to select a second transit location, receiving a selection for a second transit location, and sending an authorization request message to an issuer, wherein the authorization request message includes data relating to the first transit location and the second transit location, wherein the authorization request message requests authorization to pay for a transit fare for a journey from the first transit location to the second transit location; and wherein the issuer subsequently approves or declines the authorization request message.

Another embodiment of the invention is directed to a method for conducting a transit transaction, the method comprising receiving an authorization request message from a mobile communication device wherein the authorization request message includes data relating to the first transit location and the second transit location, wherein the authorization request message requests authorization to pay for a transit fare for a journey from the first transit location to the second transit location and sending an authorization response message to the mobile communication device wherein the authorization response message indicates whether the payment for transit fare is approved or declined.

Another embodiment of the invention is directed to a method for conducting a transit transaction, the method comprising entering a transit system with a mobile communication device at a first transit location, selecting a second transit location using the mobile communication device, and initiating the sending of an authorization request message to an issuer associated with the mobile communication device, wherein the authorization request message includes data relating to the first transit location and the second transit location, wherein the authorization request message requests authorization to pay for a transit fare for a journey from the first transit location to the second transit location wherein the issuer subsequently approves or declines the authorization request message.

These and other embodiments of the invention are described in further detail bellow.

DETAILED DESCRIPTION

Embodiments of the present invention are directed to systems, apparatuses and methods for the payment and collection of transit fares, and more specifically, to a system and associated apparatus and method that utilizes a mobile device such as a mobile phone to enable payment of a transit fare. The present invention is further directed to systems, methods and apparatuses for using a contactless element such as an integrated circuit chip embedded in a wireless mobile device that may combine transaction payment and transit fare payment capabilities as well as utilizing a graphical display on the wireless mobile device to select destination locations for transit.

Embodiments of the invention allow a transit user to utilize his or her mobile communication device such as a mobile phone, a personal digital assistant (PDA), or a handheld computer to pay a transit fare. Instead of purchasing a separate ticket or pass or employing a separate contactless payment card, a user could use his or her current mobile communication device to pay a transit fare and access one or more transit systems. For example, a user that owns a mobile phone with a contactless element can use the mobile phone to enter a transit system by swiping the mobile phone in front a device located at the gate of a subway system or in the doorway of a bus. After swiping the device, the user is allowed access to the subway or bus and a map is automatically displayed on the user's mobile phone so that the user can select his or her destination. Once a destination is selected, the transit fare is calculated and payment is authorized, thus utilizing the time the user is in transit. Upon exit of the transit system, a user may swipe his or her mobile phone in front of a device located at the exit of the transit system. This eliminates the need for advance purchase and multiple tickets or cards, the wait time for a user to pass a ticket or card through a card reader, and advance authorization time for payment cards.

Figure 1:
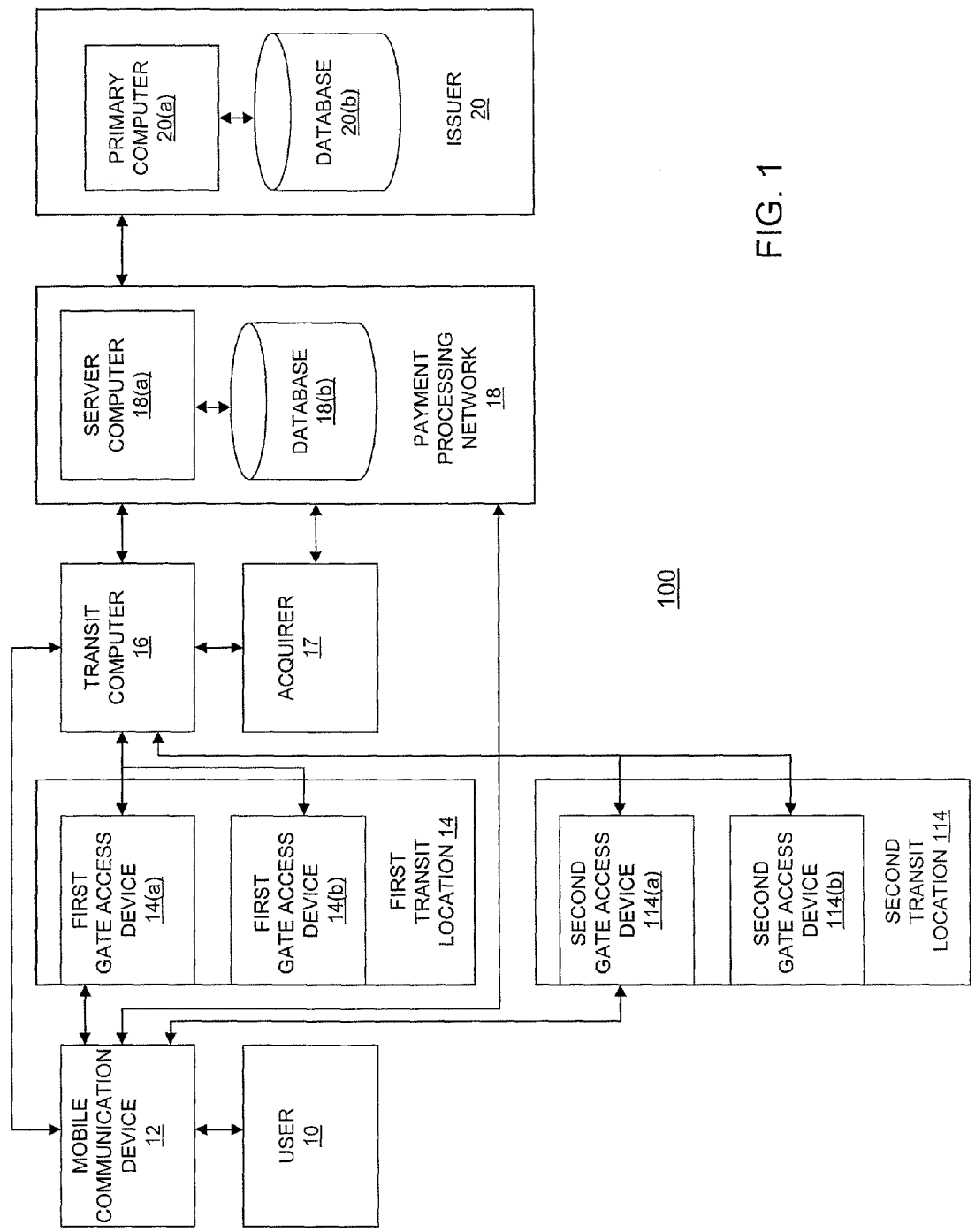
FIG. 1 shows a block diagram of a system according to an embodiment of the invention.

FIG. 1 is a functional block diagram of an embodiment of a system 100 for enabling a mobile communication device to be used in the transit fare payment and collection environment, in accordance with an embodiment of the present invention. FIG. 1 shows a user 10, a mobile communication device 12, a plurality of transit locations 14 and 114 comprising a plurality of gate access devices 14(a)-(b) and 114(a)-(b), a transit computer 16, an acquirer 17, a payment processing network 18 including a server computer 18(a)

and a database 18(*b*), and an issuer 20 including a primary computer 20(*a*) and an associated database 20(*b*).

For simplicity of illustration, one user, one mobile communication device, two transit locations, one transit computer, one acquirer, and one issuer are shown. It is understood, however, that embodiments of the invention may included multiple users, mobile communication devices, transit locations, transit computers, acquirers, and issuers. In addition, some embodiments of the invention may include fewer than all of the components shown in FIG. 1. The above-described components can be in operative communication with each other, and/or may be operatively coupled to each other in any suitable manner. The acquirer 17 and issuer 20 can communicate through the payment processing network 18. Also, the components in FIG. 1 may communicate via any suitable communication medium (including the Internet), using any suitable communication protocol.

The user 10 of the mobile communication device 12 may be a consumer of goods and/or services, and/or may be a patron of various transit systems.

Embodiments of the invention may include any suitable mobile communication device. The mobile communication device 12 has wireless communications capabilities and may be in any suitable form. For example, the mobile communication device can be hand-held and compact so that it can fit into a user's wallet and/or pocket (e.g., pocket-sized). Examples of suitable mobile communication devices may include wireless cellular or mobile telephones, personal digital assistances (PDAs), handheld computers, laptop computers, pagers, etc. In a typical embodiment, mobile communication device 12 is a mobile phone, although as noted, implementation of the present invention is not limited to this embodiment. In the case of a mobile phone as a the mobile communication device 12, the device includes mobile device (cell phone) circuitry that is capable of communicating wirelessly with a cellular system (i.e., a wireless carrier) via a cellular network.

The mobile communication devices may interface with point of service (POS) terminals using any suitable mechanism including any suitable electrical, magnetic, or optical interfacing system. For example, a contactless system such as an RF (radio frequency) device recognition system or contact system such as a magnetic stripe may be used to interface with a POS terminal containing a contactless reader or a magnetic stripe reader, respectively.

The mobile communication device 12 may include a volatile or non-volatile memory to store information such as the cardholder's primary account (PAN) number, name, and other information. In some embodiments, the mobile communication device 12 may be have multiple functions. For example, the mobile communication device 12 can be used in a retail environment in some embodiments, and could also be additionally or alternatively used in a transit environment.

Figure 2:
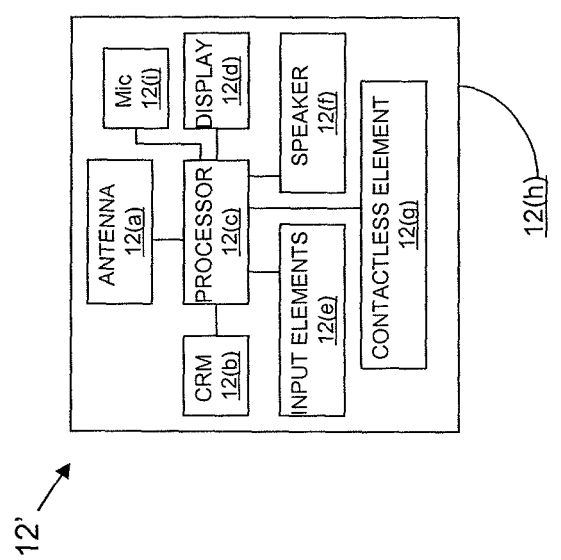
FIG. 2 shows a block diagram illustrating components of an exemplary mobile communication device.

The mobile communication device 12 may comprise a computer readable medium 12(*b*) and a body 12(*h*) as shown in FIG. 2. For simplicity of illustration, a specific number of components is shown in FIG. 2. However, it is understood that in other embodiments of the invention, there can be many more components or fewer components. The computer readable medium 12(*b*) may be present within body 12(*h*), or may be detachable from it. The body 12(*h*) may be in the form of a plastic substrate, housing, or other structure. The computer readable medium 12(*b*) may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card information, account balance information, expiration date, consumer information such as name, date of birth, etc. Any of this information may be transmitted by the mobile communication device 12'.

The computer readable medium 12(*b*) may comprise code for receiving a first transit location, code for displaying options to select a second transit location, code for receiving a selection for a second transit location, code for determining a transit fare, code for displaying a transit fare, and code for sending an authorization request message to an issuer associated with the mobile communication device. It may also comprise code for receiving an authorization response message from the issuer and code for displaying an authorization response message.

The mobile communication device 12' may further include a contactless element 12(*g*), which is typically implemented in the form of a semiconductor chip (or other data storage element) with an associated wireless transfer (e.g., data transmission) element, such as an antenna. Contactless element 12(*g*) is associated with (e.g., embedded within) mobile communication device 12' and data or control instructions transmitted via a cellular network may be applied to contactless element 12(*g*) by means of a contactless element interface (not shown). The contactless element interface functions to permit the exchange of data and/or control instructions between the mobile device circuitry (and hence the cellular network) and an optional contactless element 12(*g*).

Contactless element 12(*g*) is capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the mobile communication device 12' and a payment processing network 18 or it can be used to exchange data between the mobile communication device 12' and the transit computer 16 or the a transit location 14. Thus, the mobile communication device 12' is capable of communicating and transferring data and/or control instructions via both cellular network and near field communications capability.

The mobile communication device 12' may also include a processor 12(*c*) (e.g., a microprocessor) for processing the functions of the mobile communication device 12' and a display 12(*d*) to allow a consumer to see phone numbers, graphics, and other information and messages. The mobile communication device 12' may further include input elements 12(*e*) to allow a consumer to input information into the device, a speaker 12(*f*) to allow the consumer to hear voice communication, music, etc., and a microphone 12(*i*) to allow the consumer to transmit his or her voice through the mobile communication device 12'. The mobile communication device 12' may also include an antenna 12(*a*) for wireless data transfer (e.g., data transmission).

Returning to FIG. 1, the system 100 may include an acquirer 17 and an issuer 20. The acquirer 17 may be a bank that is associated with the transit agency associated with the transit location 14.

As used herein, an acquirer is typically a business entity, e.g., a commercial bank that has a business relationship with a particular merchant or an ATM. An issuer is typically a business entity (e.g., a bank) which issues a mobile communication device such as a credit or debit card to a consumer or issues credit or debit capabilities for use with or within the mobile communication device. Some entities can be both issuer and acquirer functions. Embodiments of the invention encompass such single entity issuer-acquirers.

The transit locations 14 and 114 can be any suitable location that is associated with transit. For example, the transit location can be a bus stop, a subway station, a train station, an airport, etc. In addition, although "transit" is discussed in detail herein, embodiments of the invention can be used in any suitable situation where access to a particular location is desired, but is conditional upon authorization (e.g., building access or venue access).

A first transit location 14 may be associated with a first transit system such as a subway system. A second transit location 114 may be associated with a second transit system such as a bus system. The user's journey may be solely on the first transit system, or may take place using a combination of transit systems. For example, the user may use the first transit system such as a subway system and a second transit system such as a bus system. The user may receive a free transfer on the bus as a result of the user's use of the transit system.

Each of the computers 16, 18(*a*), and 20(*a*) shown in FIG. 1 can be a powerful computer or cluster of computers. For examples, the server computer 18(*a*) can be a large mainframe, a minicomputer cluster, or a group of servers functioning as a unit. In one example, the server computer may be a database server coupled to a web server. The primary computer 18(*a*) may also comprise a processor and a computer readable medium.

The payment processing network 18 may comprise or use a payment processing network such as VisaNet™. The payment processing network 18 and any communication network that communicates with the payment processing network 18 may use any other suitable wired or wireless network, including the Internet. The payment processing network 18 may be adapted to process ordinary debit or credit card transactions in addition to processing transactions associated with the loading and/or reloading of value on mobile communication devices. The payment processing network 18 may have a server computer 18(*a*) and a database 18(*b*) associated with the server computer 18(*a*).

The issuer 20 may have a primary computer 20(*a*) and a database 20(*b*) associated with the primary computer 20(*a*). The primary computer 20(*a*) may comprise a processor and a computer readable medium. The computer readable medium may comprise code or instructions for receiving an authorization request message, determining a transit fare, generating an authorization response message, and sending an authorization response message to a gate access device 14(*a*), 14(*b*), 114(*a*) and/or 114(*b*), a mobile communication device 12, and/or a transit computer 16.

The transit computer 16 may comprise a processor and a computer readable medium. The computer readable medium may comprise instructions or code for receiving data related to the user 10, mobile communication device 12 or transit location 14 or 114, determining a transit fare, sending data relating to the transit fare to an acquirer 17, which may be associated with the transit agency, sending data relating to the transit fare to an issuer 20 associated with the mobile communication device 12, generating an authorization request message, sending an authorization request message to an acquirer 17 or an issuer 20, receiving an authorization response message, and sending an authorization response message to a gate access device 14(*a*), 14(*b*), 114(*a*) and/or 114(*b*), and/or a mobile communication device 12.

Figure 3:
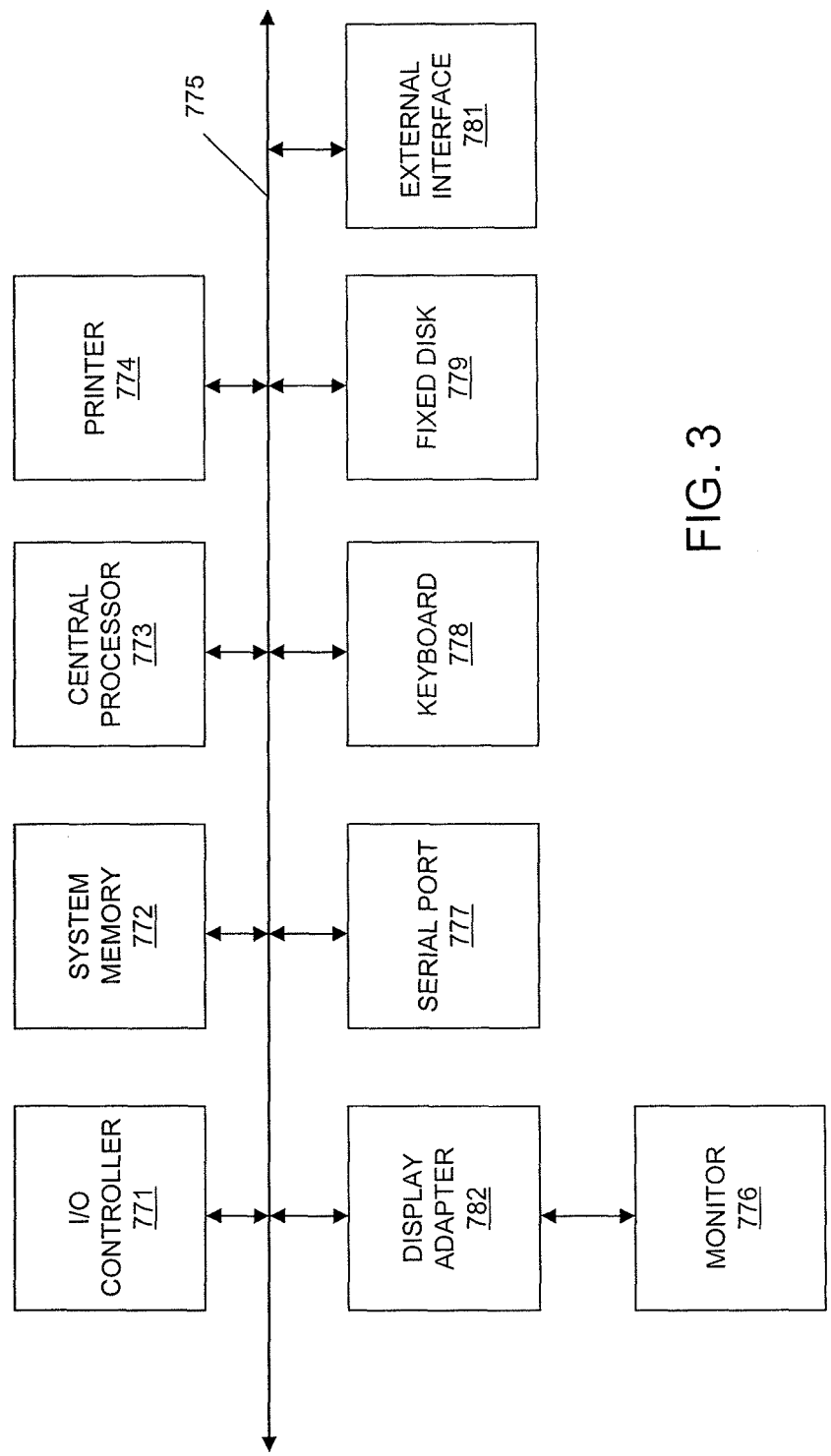
FIG. 3 shows a block diagram of an exemplary computer apparatus.

FIG. 3 shows a block diagram of a computer. Any of the computers 16, 18(*a*), 20(*a*) in FIG. 1 may utilize any suitable number of subsystems. Examples of such subsystems or components are shown in FIG. 3. The subsystems shown in FIG. 3 are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Figure 4:
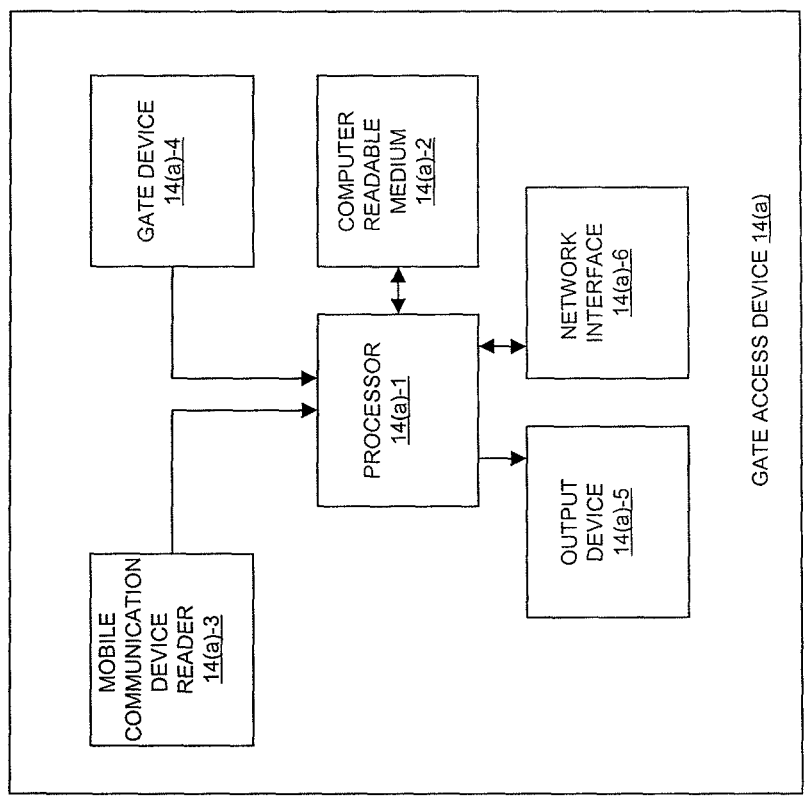
FIG. 4 shows a block diagram illustrating components that can be in a gate access device.

FIG. 4 shows a block diagram showing basic components that may reside in an exemplary gate access device 14(*a*). An exemplary gate access device 14(*a*) may comprise a processor 14(*a*)-1. It may also comprise a computer readable medium 14(*a*)-2, a mobile communication device reader 14(*a*)-3, a gate device 14(*a*)-4 such as a turnstile, an output device 14(*a*)-5, and a network interface 14(*a*)-6, all operatively coupled to the processor 14(*a*)-1. A housing may house one or more of these components. Exemplary mobile communication device readers can include RF (radio frequency) antennas, magnetic stripe readers, etc. that interact with the mobile communication device 12. Suitable output devices may include displays and audio output devices. Exemplary computer readable media may include one or more memory chips, disk drives, etc.

The computer readable medium 14(*a*)-2 may store code or instructions for allowing gate access device 14(*a*) to operate in the manner described herein. The instructions may be executed by the processor 14(*a*)-1. The computer readable medium may comprise code or instructions for receiving a request for access to a location at a gate access device, sending location information to a mobile communication device 12 or transit computer 16, receiving data related to the user 10, mobile communication device 12, or transit computer 16, generating an authorization request message, sending an authorization request message to an issuer, and receiving an authorization response message.

The network interface 14(*a*)-6 may allow the gate access device 14(*a*) to send and receive messages from the mobile communication device 12, transit computer 16, acquirer 17, payment processing network 18, and/or the issuer 20.

FIGS. 5-8 each show a flowchart illustrating methods according to embodiments of the invention. It is understood that methods according to embodiments of the invention may include some, all or any suitable combination of steps shown in these figures. Methods according to embodiments of the invention will be described using each of the flowcharts in FIGS. 5-8 with reference to FIGS. 1 and 9-11.

Figure 5:
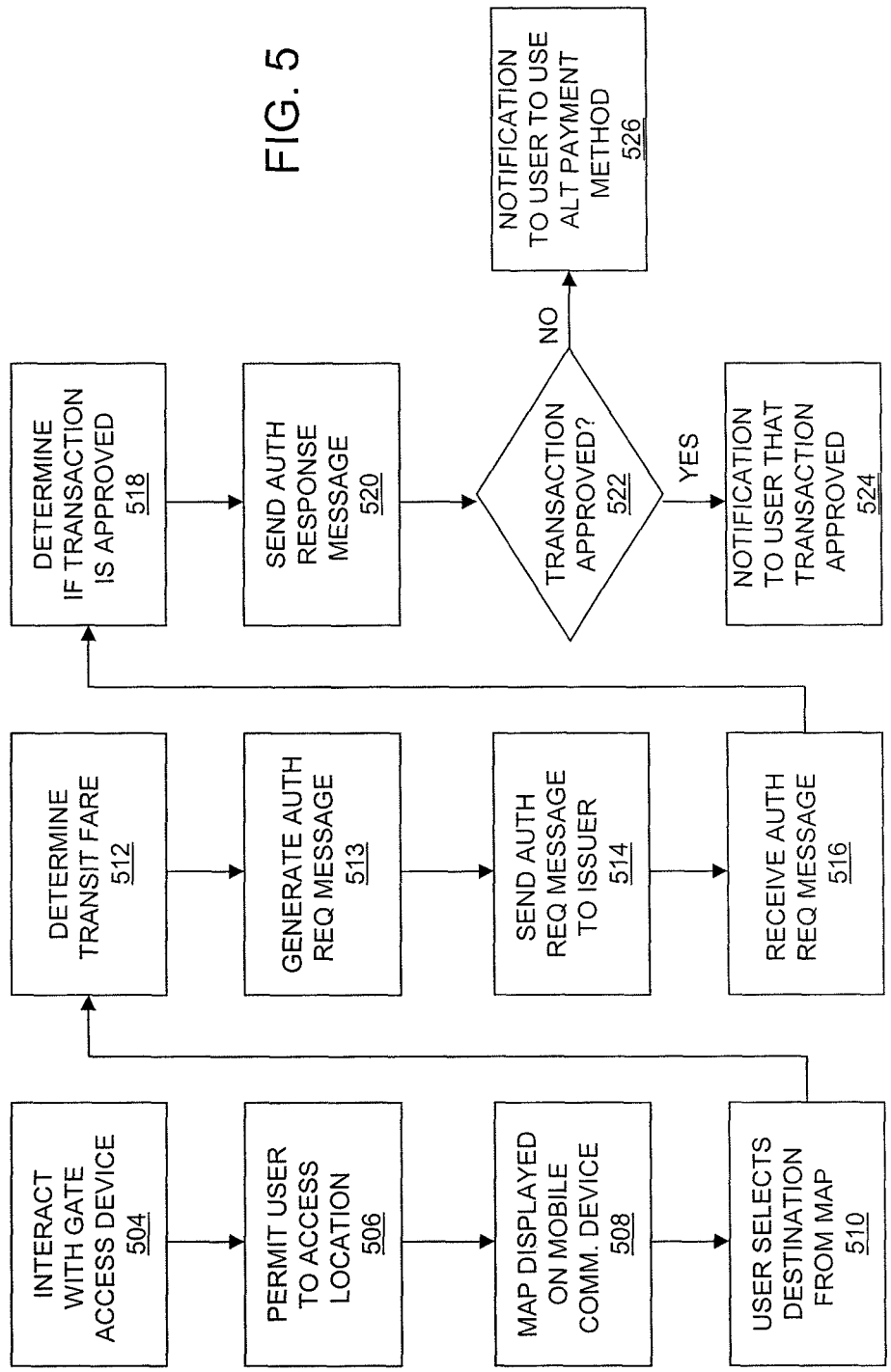
FIG. 5 shows a flowchart illustrating some embodiments of the invention.

As shown in FIG. 5, first, a user 10 of a transit system interacts with a first gate access device 14(*a*) using a mobile communication device 12 (step 504). Any suitable type of interaction can take place. For example, the mobile communication device 12 may be in the form of a cellular telephone that includes a contactless element including a chip and an antenna. The first gate access device 14(*a*) may have a corresponding contactless reader than can read data stored in the chip via the antenna. Accordingly, a user 10 may swipe his or her cellular phone in front of a reader on the first gate access device 14(*a*).

User data may be transferred from the mobile communication device 12 to the first gate access device 14(*a*). The first gate access device 14(*a*) may be a first gate access device 14(*a*) at a first transit location 14. The first transit location 14 may be, for example, a subway station and may have a plurality of gate access devices 14(*a*)-(*b*) which prevent users from accessing transit services at the transit location 14 until the user is authorized to do so. After the mobile communication device 12 interacts with the first gate access device 14(*a*), the user 10 is granted or denied access to the transit system. In embodiments of the invention, the user is usually granted access to the system before it is proven that the user can pay for the intended journey. The user might be denied access if, for example, the first gate access device 14(*a*) could not read data from the mobile communication device 12.

If the user 10 is granted access, authorization of the fare payment can be done during transit to speed up the process of accessing the transit system. If the mobile communication device 12 holds funds (optional) then the user 10 may be notified about the amount of funds available via the mobile communication device 12.

Once the user 10 is granted access to the transit system (step 506), location data of the first gate access device 14(*a*) may be transferred from the first gate access device 14(*a*) to the mobile communication device 12 or from the transit computer 16 to the mobile communication device 12. In the alternative, the mobile communication device 12 may have location determining technology such as GPS (Global Position System) capabilities to detect the user's start location.

Figure 9:
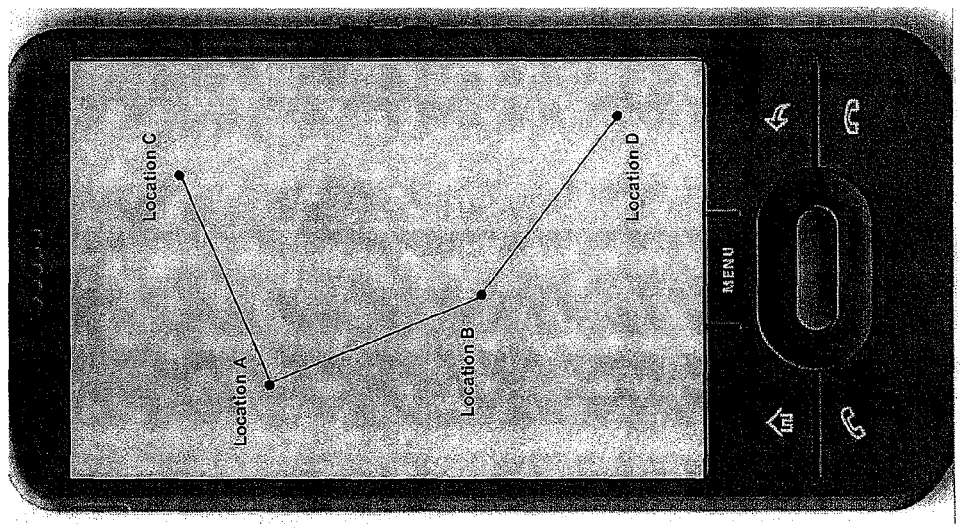
FIG. 9 is a front view illustrating a map displayed on one type of mobile communication device.

A map may then be displayed to the user 10 via the mobile communication device 12 (step 508). The user 10 may select a destination location on the map (step 510). For example, a user may be in downtown San Francisco (Location A) and traveling to the San Francisco International Airport (Location D). A map showing all of the possible destination locations may be displayed on the user's mobile phone as shown in FIG. 9. A user can then select via touch screen or other input device (e.g., buttons, voice) the San Francisco International Airport as the user's destination.

Figure 10:
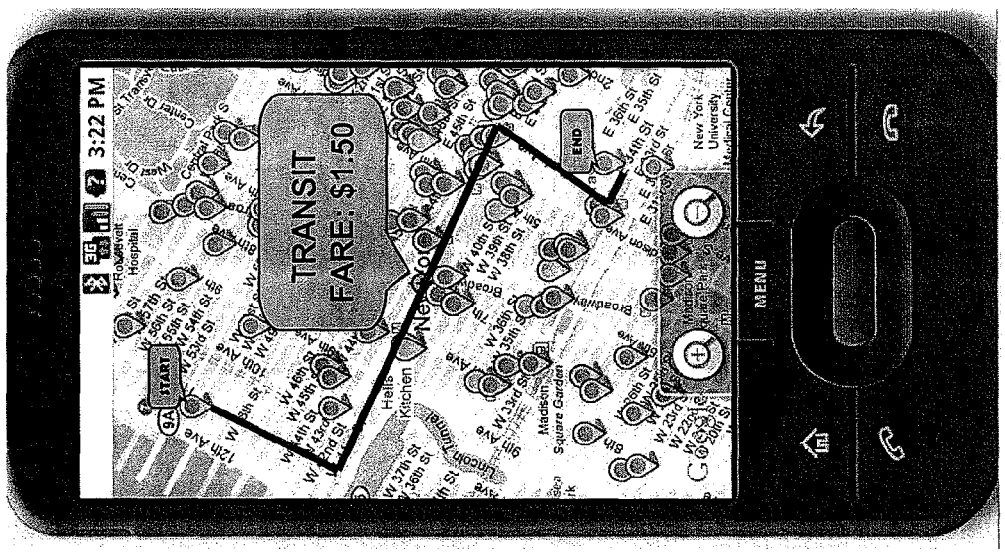
FIG. 10 is a front view illustrating a map displayed on one type of mobile communication device.

After the user 10 selects a destination, a transit fare may be calculated using the first transit location and the user selected destination (step 512). In some embodiments, the mobile communication device 12 can calculate the transit fare using information including the first transit location, the user selected destination, and a fare pricing scheme provided by the transit agency that operates the system being used by the user. The fare pricing scheme may be part of an applet or other suitable program that is stored in a memory in the mobile communication device 12. In other embodiments of the invention, the transit computer 16 or some other remote or local computer can calculate the transit fare. In these embodiments, the mobile communication device 12 can send data including the first transit location and the user selected destination to the transit computer 16, and the transit computer 16 may send the fare data back to the mobile communication device 12. Alternatively, as described in further detail below, the transit computer 16 could determine the appropriate fare for the user and could send an authorization request message including the fare amount directly to the payment processing network 18 for authorization. FIG. 10 shows a map with markers representing individual transit locations (e.g., bus, streetcar, or subway stops), The calculated transit fare can be displayed to the user 10 via the mobile communication device 12 as shown in FIG. 10.

If the calculation is done by the mobile communication device 12, the mobile communication device 12 next generates an authorization request message to request authorization for payment of the calculated transit fare (step 513). The authorization request message may include the calculated fare amount and may also include information (or any such subset of information) about the user 10 and the mobile communication device 12 including a BIN number, an expiration date, a dynamic or static verification valued, or other information. The authorization request message can be sent to the issuer 20 (step 514) by the mobile communication device 12 via the transit computer 16 and the payment processing network 18 or can be sent directly to the issuer 20 via the payment processing network 18.

If the calculation is done by the transit computer 16, then the mobile communication device 12 sends a message to the transit computer 16 with the first transit location and the user selected destination. This message may also include information (or any such subset of information) about the user 10 and the mobile communication device 12 including a BIN number, an expiration date, a dynamic or static verification valued, or other information. Once the transit computer 16 receives this information, it calculates the transit fare and generates an authorization request message to request payment of the transit fare (step 513). The authorization request message may include the calculated fare amount and may also include information (or any such subset of information) about the user 10 and the mobile communication device 12 including a BIN number, an expiration date, a dynamic or static verification valued, or other information. The authorization request message is then sent by the transit computer 16 to the issuer 20 (step 514) via the payment processing network 18.

The authorization request message is then received (step 516) by the primary computer 20(*a*) at the issuer 20 after it passes from the payment processing network 18. After the authorization request message is received, a determination is then made as to whether or not the transaction is approved (step 518). The primary computer 20(*a*) can communicate with an associated database 20(*b*), which may contain information regarding the status of an account associated with the mobile communication device 12. If the user associated with the account has sufficient credit or funds in the account, then the transaction may be authorized. If there are insufficient funds or credit in the user's account, then the transaction may not be authorized.

After a determination is made as to whether or not the transaction is authorized, the issuer 20 sends an authorization response message to the user 10 (step 520) via payment processing network 18 and the user's mobile communication device 12. In addition, an authorization response message may be sent to the transit computer 16 via the payment processing network 18, which may then optionally forward data derived therefrom to the second gate access device 114(*a*). In the alternative, the issuer 20 may send an authorization response message to the user 10 via the payment processing network 18, the transit computer 16 and the mobile communication device 12. The authorization response message may contain information indicating whether or not the transaction was approved (step 522).

Figure 11:
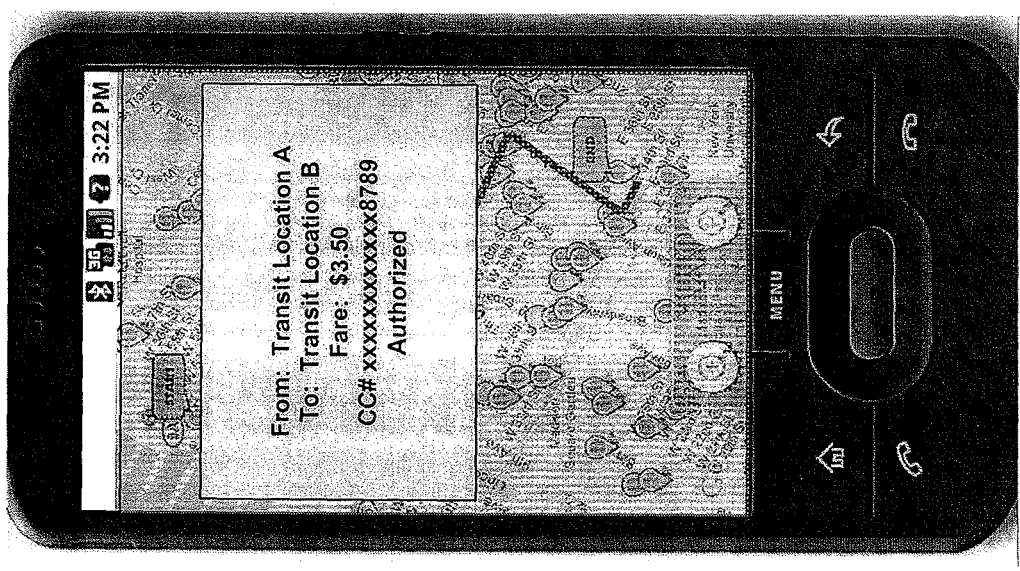
FIG. 11 is a front view illustrating a map displayed on one type of mobile communication device.

If the authorization response message indicates that the transaction is approved, a message may be displayed on the mobile communication device 12 to notify the user 10 that the transit fare was approved (step 524) as shown in FIG. 11.

If the authorization response message indicates that the transaction was denied, a message may be displayed on the mobile communication device 12 notifying the user 10 that the user 10 should see a transit official or use an alternative method of payment (step 526). Optionally, a message could be sent to the transit operator (e.g., train driver or other transit personnel) that the transaction was denied and alternate payment should be requested.

At the end of his or her journey, the user 10 exits the transit system. Upon exit, the user 10 may swipe his or her mobile communication device 12 (e.g., cellular phone) in front of a reader in the second gate access device 114(*a*). Data associated with the authorization request message and/or the mobile communication device 12 may then be transferred from the mobile communication device 12 to the second gate access device 114(*a*). As noted above, data indicating that the user's payment for the journey was authorized by the issuer 20 was already sent to the transit computer 16 and/or the second gate access device 114(*a*). The gate device of the second gate access device 114(*a*) can thereafter actuate to let the user 10 exit the transit system. In this and other embodiments of the invention, the gate access device can actuate in any suitable manner. For example, a gate device, in the form of a turnstile can turn or unlock to allow a user to pass by the turnstile. In another embodiment, the gate access device may comprise a door or bar that moves to allow the user to access a transit location.

Figure 6:
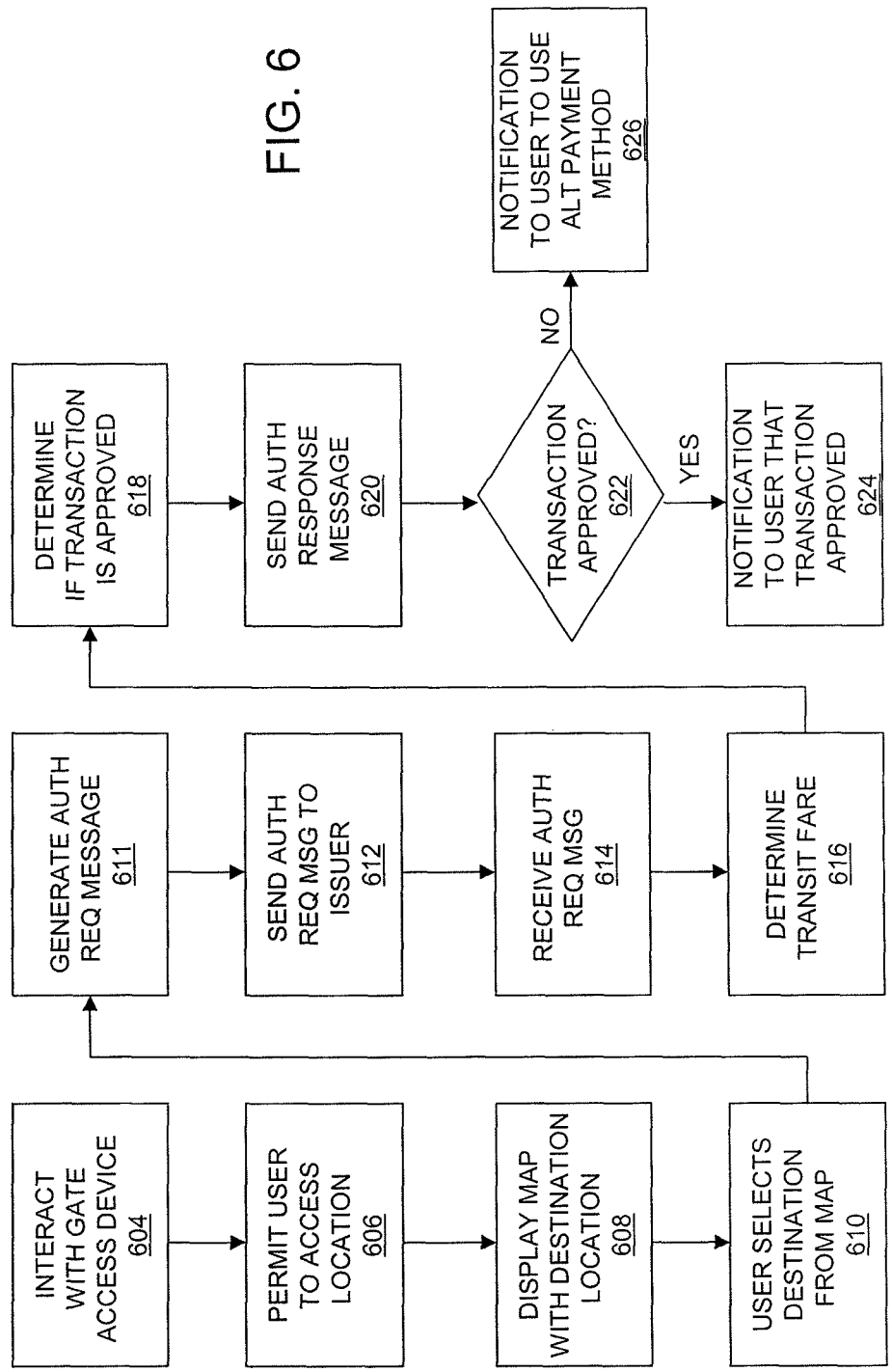
FIG. 6 shows another flowchart illustrating other embodiments of the invention.

Referring to FIG. 6, first, a user 10 of a transit system interacts with a first gate access device 14(*a*) using a mobile communication device 12 (step 604). Any suitable type of interaction can take place. For example, the mobile communication device 12 may be in the form of a cellular telephone that includes a contactless element including a chip and an antenna. The first gate access device 14(*a*) may have a corresponding contactless reader than can read data stored in the chip via the antenna. Accordingly, a user may swipe his or her cellular phone in front of a reader on the first gate access device 14(*a*).

User data may be transferred from the mobile communication device 12 to the first gate access device 14(*a*). The first gate access device 14(*a*) may be a first gate access device 14(*a*) at a first transit location 14. The first transit location 14 may be, for example, a subway station and may have a plurality of gate access devices 14(*a*)-(*b*) which prevent users from accessing transit services at the transit location 14 until the user is authorized to do so. After the mobile communication device 12 interacts with the first gate access device 14(*a*), the user 10 is granted or denied access to the transit system. In embodiments of the invention, the user is usually granted access to the system before it is proven that the user can pay for the intended journey. The user might be denied access if, for example, the first gate access device 14(*a*) could not read data from the mobile communication device 12.

If the user 10 is granted access, authorization of the fare payment can be done during transit to speed up the process of accessing the transit system. If the mobile communication device 12 holds funds (optional) then the user 10 may be notified about the amount of funds available via the mobile communication device 12.

Once the user 10 is granted access to the transit system (step 606), location data of the first gate access device 14(*a*) may be transferred from the first gate access device 14(*a*) to the mobile communication device 12 or from the transit computer 16 to the mobile communication device 12. In the alternative, the mobile communication device 12 may have location determining technology such as GPS capabilities to detect the user's start location.

A map may then be displayed to the user 10 via the mobile communication device 12 (step 608). The user 10 may then select a destination location on the map (step 610). For example, a user may be in downtown San Francisco (Location A) and traveling to the San Francisco International Airport (Location D). A map showing all of the possible destination locations may be displayed on the user's mobile phone as shown in FIG. 9. A user can then select via touch screen or other input device (e.g., buttons, voice) the San Francisco International Airport as the user's destination.

After the user 10 selects a destination, an authorization request message is generated (step 611) by either the mobile communication device 12 or the transit computer 16, to request authorization for payment of the transit fare. As discussed above, by selecting a destination location and generating an authorization request message after a user enters the transit system, the transit time can be utilized to obtain payment authorization for the transit fare. An authorization request message may include the first transit location and the user selected destination information, and may also include information (or any such subset of information) about the user 10 and the mobile communication device 12 including a BIN number, an expiration date, a dynamic or static verification valued, or other information.

If the mobile communication device 12 generates the authorization request message, the authorization request message can be sent to the issuer 20 (step 612) by the mobile communication device 12 via the transit computer 16 and the payment processing network 18 or can be sent directly to the issuer 20 via the payment processing network 18. If the transit computer 16 generates the authorization request message, then the mobile communication device 12 may send information to the transit computer 16 to include in the authorization request message.

After receiving the information from the mobile communication device 12, the transit computer 16 generates the authorization request message. The authorization request message is sent to the issuer 20 (step 612) by the transit computer 16 via the payment processing network 18. As mentioned above, in addition to the first transit location and the user destination, this message may also include information (or any such subset of information) about the user 10 and the mobile communication device 12 including a BIN number, an expiration date, a dynamic or static verification valued, or other information.

The authorization request message is then received (step 614) by the primary computer 20(*a*) at the issuer 20 after it passes from the payment processing network 18. After the authorization request message is received, a transit fare may be calculated (step 616) using information including the first transit location, the user destination, and a fare pricing scheme provided by the transit agency that operates the system being used by the user. The issuer 20 may send the fare data back to the mobile communication device 12. FIG. 10 shows a map with markers representing individual transit locations (e.g., bus, streetcar, or subway stops), The calculated transit fare can be displayed to the user 10 via the mobile communication device 12 as shown in FIG. 10.

Next, a determination is made as to whether or not the transaction is approved (step 618). The primary computer 20(*a*) can communicate with an associated database 20(*b*), which may contain information regarding the status of an account associated with the mobile communication device 12. If the user associated with the account has sufficient credit or funds in the account, then the transaction may be authorized. If there are insufficient funds or credit in the user's account, then the transaction may not be authorized.

After a determination is made as to whether or not the transaction is authorized, the issuer 20 sends an authorization response message to the user 10 (step 620) via the payment processing network 18 and the user's mobile communication device 12. In addition, an authorization response message may be sent to the transit computer 16 via the payment processing network 18, which may then optionally forward data derived therefrom to the second gate access device 114(*a*). In the alternative, the issuer 20 may send an authorization response message to the user 10 via the payment processing network 18, the transit computer 16 and the mobile communication device 12. The authorization response message may contain information indicating whether or not the transaction was approved (step 622).

If the authorization response message indicates that the transaction is approved, a message may be displayed on the mobile communication device 12 notifying that the transit fare was approved (step 624) as shown in FIG. 11. If the authorization response message indicates that the transaction was denied, a message may be displayed on the mobile computer device 12 notifying the user 10 that the user 10 should see a transit official or use an alternative method of payment (step 626). Optionally, a message could be sent to the transit operator (e.g., train driver or other transit personnel) that the transaction was denied and alternate payment should be requested.

At the end of his or her journey, the user 10 exits the transit system. Upon exit, the user 10 may swipe his or her mobile communication device (e.g., cellular phone) in front of a reader on a second gate access device 114(*a*). Data associated with the authorization request message and/or the mobile communication device 12 may then be transferred from the mobile communication device 12 to the second gate access device 114(*a*). As noted above, data indicating that the user's payment for the journey was authorized by the issuer 20 was already sent to the transit computer 16 and/or the second gate access device 114(*a*). The gate device of the second gate access device 114(*a*) can thereafter actuate to let the user 10 exit the transit system.

Figure 7:
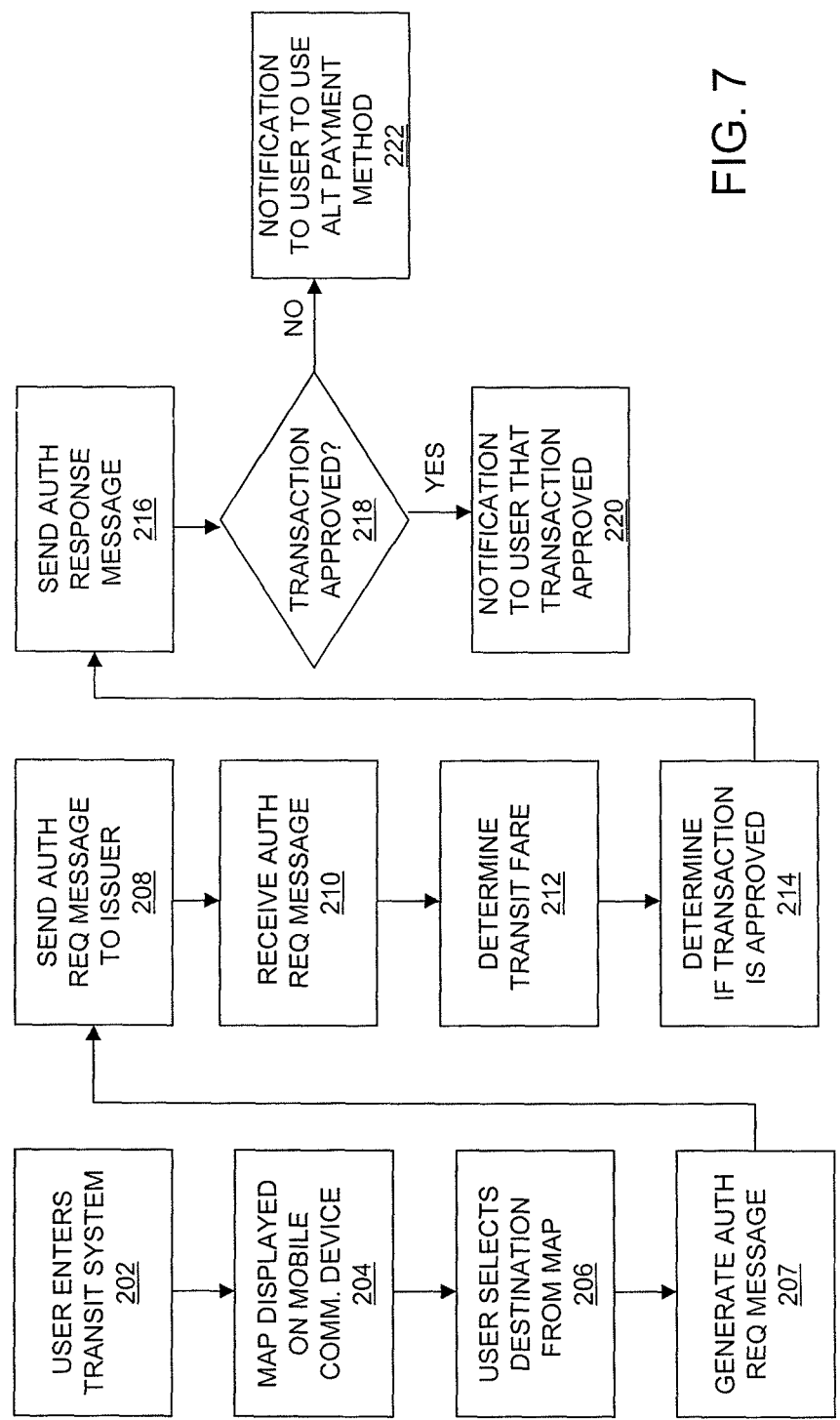
FIG. 7 shows another flowchart illustrating other embodiments of the invention.

Referring to FIG. 7, first, a user 10 enters a transit system (step 202). The system may not have a gate access device as described in earlier embodiments, instead a user may simply enter the transit system via a doorway or general entrance. For example, a user may enter a transit system by stepping onto a bus or streetcar.

As the user 10 enters the transit system, the user 10 may pull up an application on his or her mobile communication device 12 to use to gain access to the system. For example, a user may pull up the application on his or her mobile phone and then show the display to the transit operator (e.g., bus driver) that indicates the user is authorized to enter the transit system. The mobile communication device 12 may have GPS capabilities that can pinpoint the user's current location, as described earlier. If the mobile communication device 12 holds funds (optional) then the user 10 may be notified about the amount of funds available via the mobile communication device 12.

A map may then be displayed to the user 10 via the mobile communication device 12 (step 204) that shows the user's 10 start location and various destination locations. The user 10 may then select a destination location on the map (step 206). For example, a user may be in downtown San Francisco (Location A) and traveling to the San Francisco International Airport (Location D). A map showing all of the possible destination locations may be displayed on the user's mobile phone as shown in FIG. 9. A user can then select via touch screen or other input device (e.g., buttons, voice) the San Francisco International Airport as the user's destination.

After the user 10 selects a destination, an authorization request message is generated (step 207) by either the mobile communication device 12 or the transit computer 16, to request authorization for payment of the transit fare. As discussed above, by selecting and destination location and generating an authorization location after a user enters the transit system, the transit time can be utilized to obtain payment authorization for the transit fare. An authorization request message may include the first transit location and the user selected destination information, and may also include information (or any such subset of information) about the user 10 and the mobile communication device 12 including a BIN number, an expiration date, a dynamic or static verification valued, or other information.

If the mobile communication device 12 generates the authorization request message, the authorization request message can be sent (step 208) to the issuer 20 by the mobile communication device 12 via the transit computer 16 and the payment processing network 18 or can be sent directly to the issuer 20 via the payment processing network 18. If the transit computer 16 generates the authorization request message, then the mobile communication device 12 may send information to the transit computer 16 to calculate the fare and include in the authorization request message. The authorization request message is then sent (step 208) to the issuer 20 by the transit computer 16 via the payment processing network 18.

The authorization request message is then received (step 210) by the primary computer 20(*a*) at the issuer 20 after it passes from the payment processing network 18. After the authorization request message is received, a transit fare may be calculated (step 212) using the first transit location, the user destination and a fare pricing scheme provided by the transit agency that operates the system being used by the user. The issuer 20 may send the fare data back to the mobile communication device 12. FIG. 10 shows a map with markers representing individual transit locations (e.g., bus, streetcar, or subway stops), The calculated transit fare can be displayed to the user 10 via the mobile communication device 12 as shown in FIG. 10.

Next, a determination is made as to whether or not the transaction is approved (step 214). The primary computer 20(*a*) can communicate with an associated database 20(*b*), which may contain information regarding the status of an account associated with the mobile communication device 12. If the user associated with the account has sufficient credit or funds in the account, then the transaction may be authorized. If there are insufficient funds or credit in the user's account, then the transaction may not be authorized.

After a determination is made as to whether or not the transaction is authorized, the issuer 20 sends an authorization response message to the user 10 (step 216) via the payment processing network 18 and the user's mobile communication device 12. In addition, an authorization response message may be sent to the transit computer 16 via the payment processing network 18. In the alternative, the issuer 20 may send an authorization response message to the user 10 via the payment processing network 18, the transit computer 16 and the mobile communication device 12. The authorization response message may contain information indicating whether or not the transaction was approved (step 218).

If the authorization response message indicates that the transaction is approved, a message may be displayed on the mobile communication device 12 notifying that the transit fare was approved (step 220) as shown in FIG. 11. If the authorization response message indicates that the transaction was denied, a message may be displayed on the mobile computer device 12 notifying the user 10 that the user 10 should see a transit official or use an alternative method of payment (step 222). Optionally, a message could be sent to the transit operator (e.g., bus driver or other transit personnel) that the transaction was denied and alternate payment should be requested.

In the alternative, if a user 10 has a short wait time (e.g., up to a few minutes) before the bus (for example) arrives, the user 10 could obtain transit fare payment authorization before getting on the bus. For example, while waiting, the user 10 could pull up the application on his or her mobile communication device 12, the mobile communication device 12 could detect the user's location via GPS capabilities, and then display a map for the user 10 to choose a destination location. The user 10 can then selection a destination location on the map, and the calculation of transit fare and authorization process described in detail above could be completed before the user 10 steps onto the bus. The mobile communication device 12 could display an authorization message that can be shown to the driver.

Figure 8:
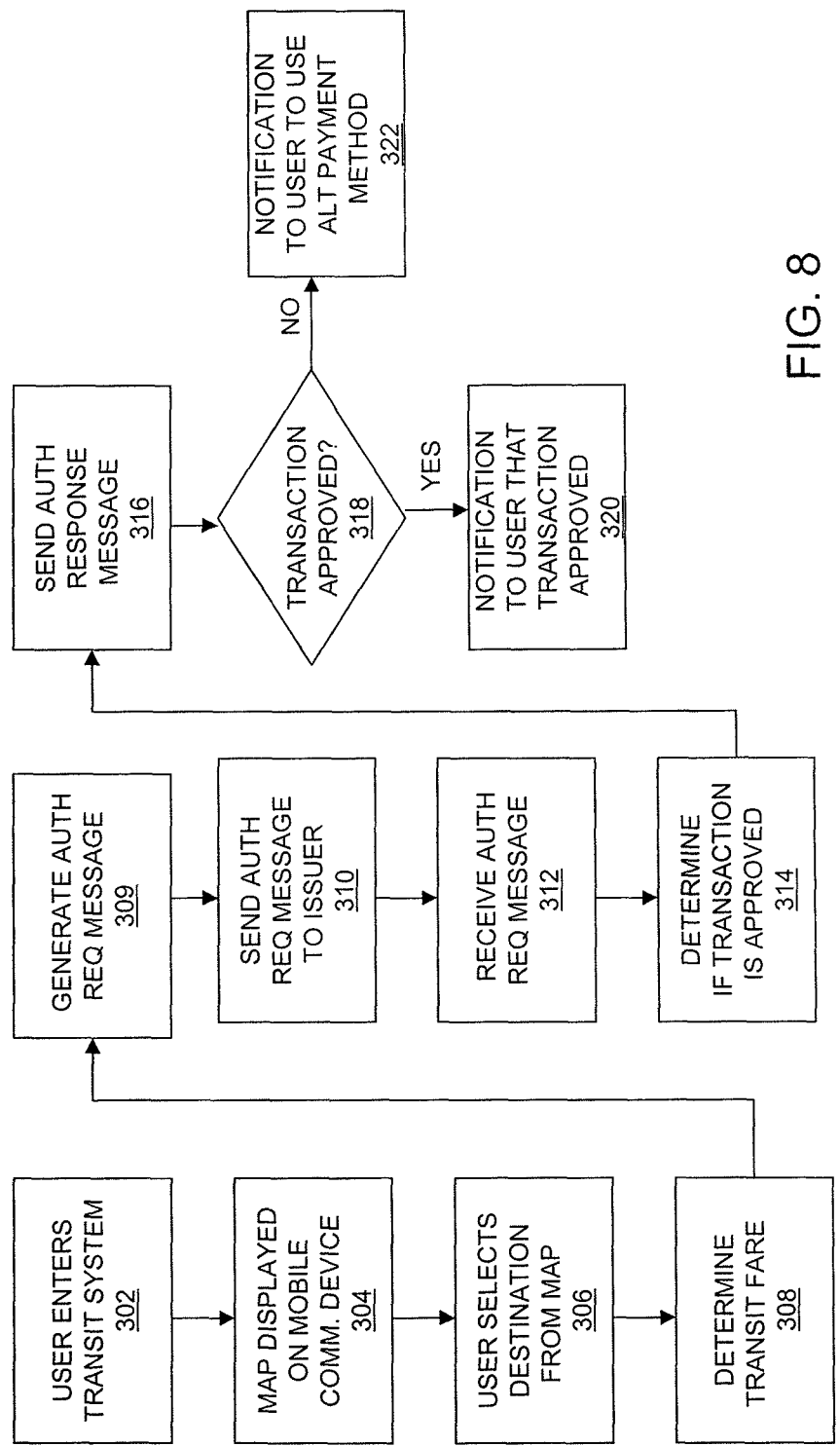
FIG. 8 shows another flowchart illustrating other embodiments of the invention.

Referring to FIG. 8, first, a user 10 enters a transit system 100 (step 302). The system may not have a gate access device as described in earlier embodiments, instead a user may simply enter the transit system via a doorway or general entrance. For example, a user may enter a transit system by stepping onto a bus or streetcar.

As the user 10 enters the transit system, the user 10 may pull up an application on his or her mobile communication device 12 to use to gain access to the system. For example, a user may pull up the application on his or her mobile phone and then show the display to the transit operator (e.g., bus driver) that indicates the user is authorized to enter the transit system. The mobile communication device 12 may have GPS capabilities that can pinpoint the user's current location, as described earlier. If the mobile communication device 12 holds funds (optional) then the user 10 may be notified about the amount of funds available via the mobile communication device 12.

A map may then be displayed to the user 10 via the mobile communication device 12 (step 304) that shows the user's 10 start location and various destination locations. The user 10 may then select a destination location on the map (step 306). For example, a user may be in downtown San Francisco (Location A) and traveling to the San Francisco International Airport (Location D). A map showing all of the possible destination locations may be displayed on the user's mobile phone as shown in FIG. 9. A user can then select via touch screen or other input device (e.g., buttons, voice) the San Francisco International Airport as the user's destination.

After the user 10 selects a destination, a transit fare may be calculated using the first transit location and the user's selected destination (step 308). In some embodiments, the mobile communication device 12 can calculate the transit fare using information including the first transit location, the user selected destination, and a fare pricing scheme provided by the transit agency that operates the system being used by the user. The fare pricing scheme may be part of an applet or other suitable program that is stored in a memory in the mobile communication device 12. In other embodiments, the transit computer 16 or some other remote or local computer can calculate the transit fare. In these embodiments, the mobile communication device 12 can send data including the first transit location and the user selected destination to the transit computer 16, and the transit computer 16 may send the fare data back to the mobile communication device 12. Alternatively, as described in further detail below, the transit computer 16 could determine the appropriate fare for the user and could send an authorization request message including the fare amount directly to the payment processing network 18 for authorization. FIG. 10 shows a map with markers representing individual transit locations (e.g., bus, streetcar, or subway stops), The calculated transit fare can be displayed to the user 10 via the mobile communication device 12 as shown in FIG. 10.

If the calculation is done by the mobile communication device 12, the mobile communication device 12 generates an authorization request message to request authorization for payment of the transit fare (step 309). An authorization request message may include the calculated fare, and may also include information (or any such subset of information) about the user 10 and the mobile communication device 12 including a BIN number, an expiration date, a dynamic or static verification valued, or other information. The authorization request message can be sent to the issuer 20 (step 310) by the mobile communication device 12 via the transit computer 16 and the payment processing network 18 or can be sent directly to the issuer 20 via the payment processing network 18.

If the calculation is done by the transit computer 16, then the mobile communication device 12 sends a message to the transit computer 16 that includes information to calculate the fare and include in the authorization request message. Once the transit computer 16 receives this information it calculates the transit fare and generates an authorization request message to request payment of the transit fare (step 309). An authorization request message may include the calculated fare, and may also include information (or any such subset of information) about the user 10 and the mobile communication device 12 including a BIN number, an expiration date, a dynamic or static verification valued, or other information. The authorization request message is then sent by the transit computer 16 to the issuer 20 (step 310) via the payment processing network 18.

The authorization request message is then received (step 312) by the primary computer 20(*a*) at the issuer 20 after it passes from the payment processing network 18. After the authorization request message is received, a determination is then made as to whether or not the transaction is approved (step 314). The primary computer 20(*a*) can communicate with an associated database 20(*b*), which may contain information regarding the status of an account associated with the mobile communication device 12. If the user associated with the account has sufficient credit or funds in the account, then the transaction may be authorized. If there are insufficient funds or credit in the user's account, then the transaction may not be authorized.

After a determination is made as to whether or not the transaction is authorized, the issuer 20 sends an authorization response message to the user 10 (step 316) via the payment processing network 18 and the user's mobile communication device 12. In addition, an authorization response message may be sent to the transit computer 16 via the payment processing network 18. In the alternative, the issuer 20 may send an authorization response message to the user 10 via the payment processing network 18, the transit computer 16 and the mobile communication device 12. The authorization response message may contain information indicating whether or not the transaction was authorized (step 318).

If the authorization response message indicates that the transaction is approved, a message may be displayed on the mobile communication device 12 notifying that the transit fare was approved (step 320) as shown in FIG. 11. If the authorization response message indicates that the transaction was denied, a message may be displayed on the mobile computer device 12 notifying the user 10 that the user 10 should see a transit official or use an alternative method of payment (step 322). Optionally, a message could be sent to the transit operator (e.g., bus driver or other transit personnel) that the transaction was denied and alternate payment should be requested.

In the alternative, if a user 10 has a short wait time (e.g., up to a few minutes) before the bus (for example) arrives, the user 10 could get transit fare payment authorization before getting on the bus. For example, while waiting, the user 10 could pull up the application on his or her mobile communication device 12, the mobile communication device 12 could detect the user's location via GPS capabilities, and then display a map for the user 10 to choose a destination location. The user 10 can then selection a destination location on the map, and the calculation of transit fare and authorization process described in detail above could be completed before the user 10 steps onto the bus. The mobile communication device 12 could display an authorization message that can be shown to the driver.

In any of the above embodiments, it is possible that a user may exit a destination location different than he or she selected upon entering the transit system. For example, a user may select a particular destination location when he or she enters the transit system but then decide to exit the transit system at a destination different from the one entered. Thus, it is necessary to determine the actual cost of the user access. This is determined after the transaction has been approved, and the user has completed his or her journey. The actual cost associated with the user's journey may be determined by the transit computer 16, which can keep track of where the user's journey starts and ends. The start and end points of the user's journey can be determined using data from the first gate access device 14(*a*) and a second gate access device 114(*a*) at the end of the user's journey. Alternatively, the actual cost associated with the user's journey may be determined by the mobile communication device 12, which can keep track of where the user's journey starts and ends.

After the actual cost of user access is determined, a clearing and settlement process then occurs. The transit computer 16 may be associated with an acquirer 17, and the acquirer 17 may receive fare data for the user from the transit computer 16. The acquirer 17 and the issuer 20 may clear and settle the user's transaction along with various other transactions. As noted above, the transit fare is calculated based on the user's start location and user selected destination. If the actual amount of the user's journey is less than this, or more than this (e.g., a user exits at a location different than what he or she selected), then this is taken into account during the clearing and settlement process between the transit agency's acquirer 17 and the issuer 20. Notification of the actual cost may be displayed to the user 10 via the mobile communication device 12.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a," "an" or "the" is intended to mean "one or more" unless specifically indicated to the contrary.

What is claimed is:

1. A mobile communication device comprising:
   a display;
   a processor; and
   a computer readable medium coupled to the processor, wherein the computer readable medium comprises code for performing operations comprising:
   transferring user data to a first access device at a first transit location to grant a user access to a transit system, wherein the first access device prevents and grants physical access to the transit system;
   receiving a first identifier of a first transit location from the first access device indicating that the user has been granted access to the transit system at the first transit location; and
   after receiving the first identifier of the first transit location from the first access device indicating that the user has been granted access to the transit system, but before the user has exited a second access device at a second transit location:
   displaying, via the display, a plurality of possible destination location options of the transit system;
   receiving, from the user, a selection of the second transit location of the plurality of possible destination location options as a destination for a journey of the user;
   determining a transit fare for the journey from the first transit location to the second transit location;
   initiating a sending of an authorization request message to an issuer associated with the mobile communication device to authorize a payment of the transit fare for the journey, during the journey from the first transit location to the second transit location; and
   receiving an indication of an authorization response message indicating that the authorization of the payment of the transit fare was approved, wherein the indication is thereafter sent to the second access device at the second transit location to actuate the second access device and allow the user to exit the transit system.

2. The mobile communication device of claim 1, wherein the operations further comprise displaying a message based upon the received indication of the authorization response message.

3. A method for conducting a transit transaction, the method comprising:
transferring, via a mobile communication device, a user data to a first access device at a first transit location to grant a user access to a transit system, wherein the first access device prevents and grants physical access to the transit system;
receiving, at the mobile communication device, a first identifier of the first transit location from the first access device indicating that the user has been granted access to the transit system at the first transit location; and
after receiving the first identifier of the first transit location from the first access device indicating that the user has been granted access to the transit system, but before the user has exited a second access device at a second transit location:
displaying, on the mobile communication device, a plurality of possible destination location options of the transit system;
receiving, from the user, a selection of the second transit location of the plurality of possible destination location options as a destination for a journey of the user;
determining, by the mobile communication device, a transit fare for the journey from the first transit location to the second transit location;
initiating a sending, via the mobile communication device, of the authorization request message to an issuer associated with the mobile communication device to authorize a payment of the transit fare for the journey during the journey from the first transit location to the second transit location; and
receiving an indication of an authorization response message indicating that the authorization of the payment for the transit fare was approved,
wherein the indication is thereafter sent to the second access device at the second transit location to actuate the second access device and allow the user to exit the transit system.

4. The method of claim 3, further comprising displaying a message based upon the received indication of the authorization response message.

5. The mobile communication device of claim 1 further comprising:
a contactless element including a chip and an antenna, wherein the mobile communication device utilizes the contactless element for said transferring of the user data to the first access device and said receiving the first transit location from the first access device.

6. The mobile communication device of claim 5 wherein the contactless element utilizes near field communication to communicate with the first access device.

7. The mobile communication device of claim 1 wherein the first transit location is a bus stop, a subway station, a train station, or an airport.

8. The mobile communication device of claim 1, wherein the operations further comprise:
displaying a notification of an amount of funds available for the transit fare.

9. The mobile communication device of claim 1, wherein said determining the transit fare comprises:
sending data including a first identifier of the first transit location and a second identifier of the second transit location; and
receiving the transit fare.

10. The mobile communication device of claim 1, wherein said determining the transit fare comprises:
calculating the transit fare based upon the first identifier of the first transit location, the second identifier of the second transit location, and a fare pricing scheme stored by the mobile communication device.

11. The mobile communication device of claim 1, wherein said authorization request message comprises:
the determined transit fare; and
a dynamic or static verification value.

12. The method of claim 3, wherein said determining the transit fare comprises:
calculating the transit fare, by the mobile communication device, based upon the first identifier of the first transit location, the second identifier of the second transit location, and a fare pricing scheme stored by the mobile communication device.

13. The method of claim 3, wherein said authorization request message comprises:
the determined transit fare; and
a dynamic or static verification value.

* * * * *